US009900377B2

(12) United States Patent
Borley et al.

(10) Patent No.: US 9,900,377 B2
(45) Date of Patent: Feb. 20, 2018

(54) DYNAMIC HEALTHCHECKING LOAD BALANCING GATEWAY

(71) Applicant: International Business Machines Corporation, Armonk, NY (US)

(72) Inventors: Andrew J. Borley, Pimperne (GB); Callum P. Jackson, Romsey (GB); Kathryn M. McMullan, Chandlers Ford (GB); Philip L. Norton, Bishopstoke (GB)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 14/821,508

(22) Filed: Aug. 7, 2015

(65) Prior Publication Data

US 2017/0041385 A1 Feb. 9, 2017

(51) Int. Cl.
*G06F 15/173* (2006.01)
*H04L 29/08* (2006.01)

(52) U.S. Cl.
CPC .................. *H04L 67/1004* (2013.01)

(58) Field of Classification Search
CPC ................................................. H04L 67/1007
See application file for complete search history.

(56) References Cited

U.S. PATENT DOCUMENTS

| 7,254,626 | B1 | 8/2007 | Kommula et al. | |
| 7,840,678 | B2 * | 11/2010 | Joshi | H04L 67/1002 709/203 |
| 8,051,152 | B2 * | 11/2011 | Rehm | H04L 67/1029 709/221 |
| 2004/0010716 | A1 * | 1/2004 | Childress | G06F 11/0748 709/223 |
| 2004/0254984 | A1 * | 12/2004 | Dinker | H04L 67/34 709/205 |

(Continued)

FOREIGN PATENT DOCUMENTS

CN 103124290 A 5/2013

OTHER PUBLICATIONS

Google, "Load Balancing Health Checks," Google Cloud Platform—Compute Engine, Last Updated Jun. 15, 2015, p. 1-6, https://cloud.google.com/compute/docs/load-balancing/health-checks, Accessed on Jul. 10, 2015.

(Continued)

*Primary Examiner* — Ario Etienne
*Assistant Examiner* — Blake Rubin
(74) *Attorney, Agent, or Firm* — Patricia B. Feighan

(57) ABSTRACT

A method for providing a dynamic healthchecking gateway is provided. The method may include receiving an application request. The method may also include determining if a plurality of load balancing information is available for the application request. The method may further include in response to determining that a plurality of load balancing information is not available for the application request, registering the requested application in a repository. The method may include monitoring the availability of a plurality of servers and the availability of the requested application. The method may additionally include determining an available runtime instance based on the monitoring. The method may also include forwarding the received application request to the determined available runtime instance.

20 Claims, 6 Drawing Sheets

(56) References Cited

U.S. PATENT DOCUMENTS

| | | | |
|---|---|---|---|
| 2008/0282254 A1 | 11/2008 | Blander et al. | |
| 2010/0080144 A1* | 4/2010 | Greenberg | H04L 12/1863 370/253 |
| 2010/0121932 A1* | 5/2010 | Joshi | H04L 67/1008 709/207 |
| 2010/0290397 A1* | 11/2010 | Narayana | H04W 28/08 370/328 |
| 2011/0238733 A1* | 9/2011 | Yoo | G06F 11/008 709/203 |
| 2013/0173809 A1* | 7/2013 | Hueter | H04L 67/1034 709/226 |
| 2013/0325885 A1* | 12/2013 | Levy | G06F 9/44505 707/758 |
| 2013/0332555 A1* | 12/2013 | Gabriel | H04L 67/1095 709/208 |
| 2014/0089746 A1* | 3/2014 | Brauer | H04L 41/0659 714/57 |
| 2014/0201344 A1* | 7/2014 | Copsey | G06F 9/505 709/223 |
| 2014/0310418 A1* | 10/2014 | Sorenson, III | 709/226 |
| 2015/0163161 A1* | 6/2015 | Arikatla | H04L 47/726 709/226 |
| 2015/0263985 A1* | 9/2015 | Schmitter | H04L 45/123 709/226 |
| 2016/0085543 A1* | 3/2016 | Islam | G06F 8/65 717/171 |
| 2016/0323197 A1* | 11/2016 | Guzman | H04L 47/726 |
| 2017/0034023 A1* | 2/2017 | Nickolov | H04L 43/0817 |

OTHER PUBLICATIONS

Mell et al., "The NIST Definition of Cloud Computing," National Institute of Standards and Technology, Sep. 2011, p. 1-3, Special Publication 800-145.

* cited by examiner

DYNAMIC HEALTHCHECKING LOAD BALANCING GATEWAY

BACKGROUND

The present invention relates generally to the field of computers, and more particularly to load balancing.

Within a solution architecture it is common practice to deploy an application to multiple instances of a runtime to provide scalability and high availability. Each runtime will normally include a number of applications, each providing their own capability. Normally a load balancing component will be used to distribute traffic across the available instances.

SUMMARY

According to one embodiment, a method for providing a dynamic healthchecking gateway is provided. The method may include receiving an application request. The method may also include determining if a plurality of load balancing information is available for the application request. The method may further include in response to determining that a plurality of load balancing information is not available for the application request, registering the requested application in a repository. The method may include monitoring the availability of a plurality of servers and the availability of the requested application. The method may additionally include determining an available runtime instance based on the monitoring. The method may also include forwarding the received application request to the determined available runtime instance.

According to another embodiment, a computer system for providing a dynamic healthchecking gateway is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving an application request. The method may also include determining if a plurality of load balancing information is available for the application request. The method may further include in response to determining that a plurality of load balancing information is not available for the application request, registering the requested application in a repository. The method may include monitoring the availability of a plurality of servers and the availability of the requested application. The method may additionally include determining an available runtime instance based on the monitoring. The method may also include forwarding the received application request to the determined available runtime instance.

According to yet another embodiment, a computer program product for providing a dynamic healthchecking gateway is provided. The computer program product may include one or more computer-readable storage devices and program instructions stored on at least one of the one or more tangible storage devices, the program instructions executable by a processor. The computer program product may include program instructions to receive an application request. The computer program product may also include program instructions to determine if a plurality of load balancing information is available for the application request. The computer program product may further include in response to determining that a plurality of load balancing information is not available for the application request, program instructions to register the requested application in a repository. The computer program product may include program instructions to monitor the availability of a plurality of servers and the availability of the requested application. The computer program product may additionally include program instructions to determine an available runtime instance based on the monitoring. The computer program product may also include program instructions to forward the received application request to the determined available runtime instance.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
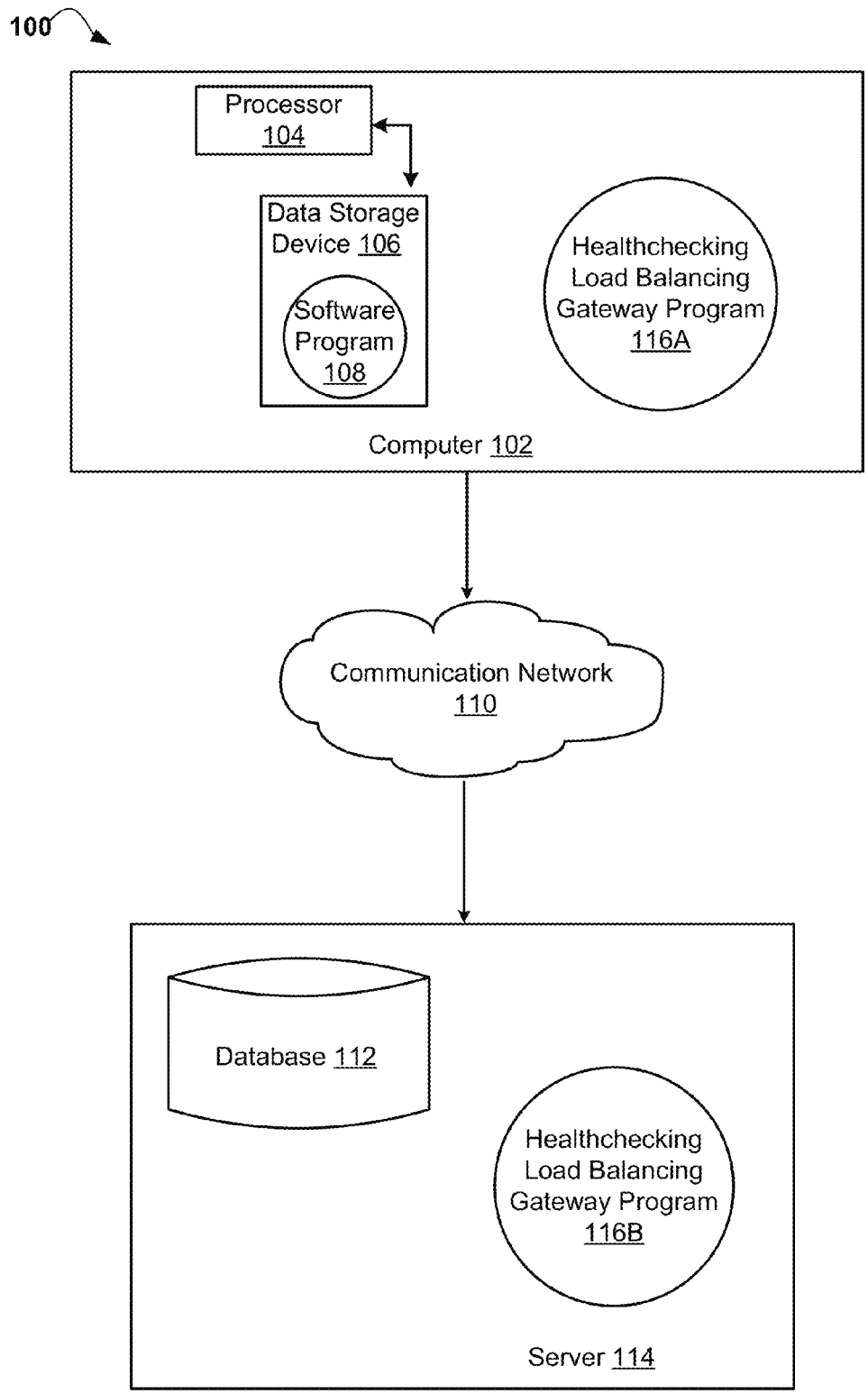
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to load balancing. The following described exemplary embodiments provide a system, method and program product to, among other things, provide a dynamic healthchecking gateway. Therefore, the present embodiment has the capacity to improve the technical field of load balancing by providing gateway load balancing capability with application level healthchecking. As such, the present embodiment provides the benefits of application load balancing with the configuration and administration of the gateway load balancer.

As previously described, it is common practice within a solution architecture to deploy an application to multiple instances of a runtime to provide scalability and high availability. Each runtime will normally include a number of applications, each providing their own capability. Normally a load balancing component will be used to distribute traffic across the available instances.

Currently, the approach to load balancing is twofold. First, an application level configuration may be created in which a configuration for each application to load balance is created. As such, each available runtime instance and healthcheck configuration may be set up. Normally the healthcheck will be configured at the application level using a HTTP HEAD requests or a similar approach, to assure that the application is available on that runtime instance.

Secondly, a Gateway is provided for a number of applications running on the runtime instances. This Gateway is configured with the runtime instances and healthchecks configuration is set up. The healthcheck will be at the runtime instance level to verify that the entire server is available.

The Gateway approach has the benefit that it handles all application requests, however it does not allow for the situation where a single application is unavailable while the server is still available. The application level healthcheck overcomes this issue, but it requires configuration for each application. As such, it may be advantageous, among other things, to provide the benefits of application load balancing with the configuration and administration of the gateway load balancer.

According to at least one implementation, the present embodiment may provide the ability of the Gateway Load Balancer to create dynamic application based health checking, without it being configured by the administrator on an application by application basis. As such, the gateway load balancer will learn and manage the applications that it is load balancing for, and automatically create the required health checking.

Therefore, the present embodiment may provide gateway load balancing capability with application level healthchecking. As such, the present embodiment may provide the benefits of application load balancing with the configuration and administration of a Gateway Load Balancer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for a dynamic healthchecking load balancing gateway. According to at least one implementation, the present embodiment has the capacity to provide the capability for a Gateway Load Balancer to provide dynamic application based health checking by dynamically building and enabling the health check configuration of applications using a gateway. More specifically, the present embodiment may dynamically check the health of applications deployed to a server by extracting the endpoint from the request message. As such, if a new application is installed, no configuration would be required to enable the health check. Therefore, the health check may be enabled on a newly added application with no additional action required from a user.

Referring to FIG. 1, an exemplary networked computer environment 100 in accordance with one embodiment is depicted. The networked computer environment 100 may include a computer 102, a processor 104, and a data storage device 106 that is enabled to run a software program 108 and a Healthchecking Load Balancing Gateway Program 116A. The networked computer environment 100 may also include a server 114 that is enabled to run a Healthchecking Load Balancing Gateway Program 116B that may interact with a database 112 and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Healthchecking Load Balancing Gateway Program 116B running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Server computer 114 may also operate in a cloud computing service model, such as Software as a Service (SaaS), Platform as a Service (PaaS), or Infrastructure as a Service (IaaS). Server 114 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Healthchecking Load Balancing Gateway Program 116A, 116B may interact with a database 112 that may be embedded in various storage devices, such as, but not limited to a computer 102, a networked server 114, or a cloud storage service.

As previously described, the client computer 102 may access the Healthchecking Load Balancing Gateway Program 116B, running on server computer 114 via the communications network 110. For example the Healthchecking Load Balancing Gateway Program 116A, 116B running on a client computer 102 may provide the ability of the Gateway Load Balancer to create dynamic application based health checking, without it being configured by the administrator on an application by application basis. As such, the Gateway Load Balancer may learn and manage the applications that it is load balancing for, and automatically create the required health checking. The Healthchecking Load Balancing Gateway method may include a gateway load balancer, an availability store (i.e., a repository, such as database 112), and a health checking component. The Healthchecking Load Balancing Gateway method is explained in more detail below with respect to FIGS. 2-3.

Figure 2:
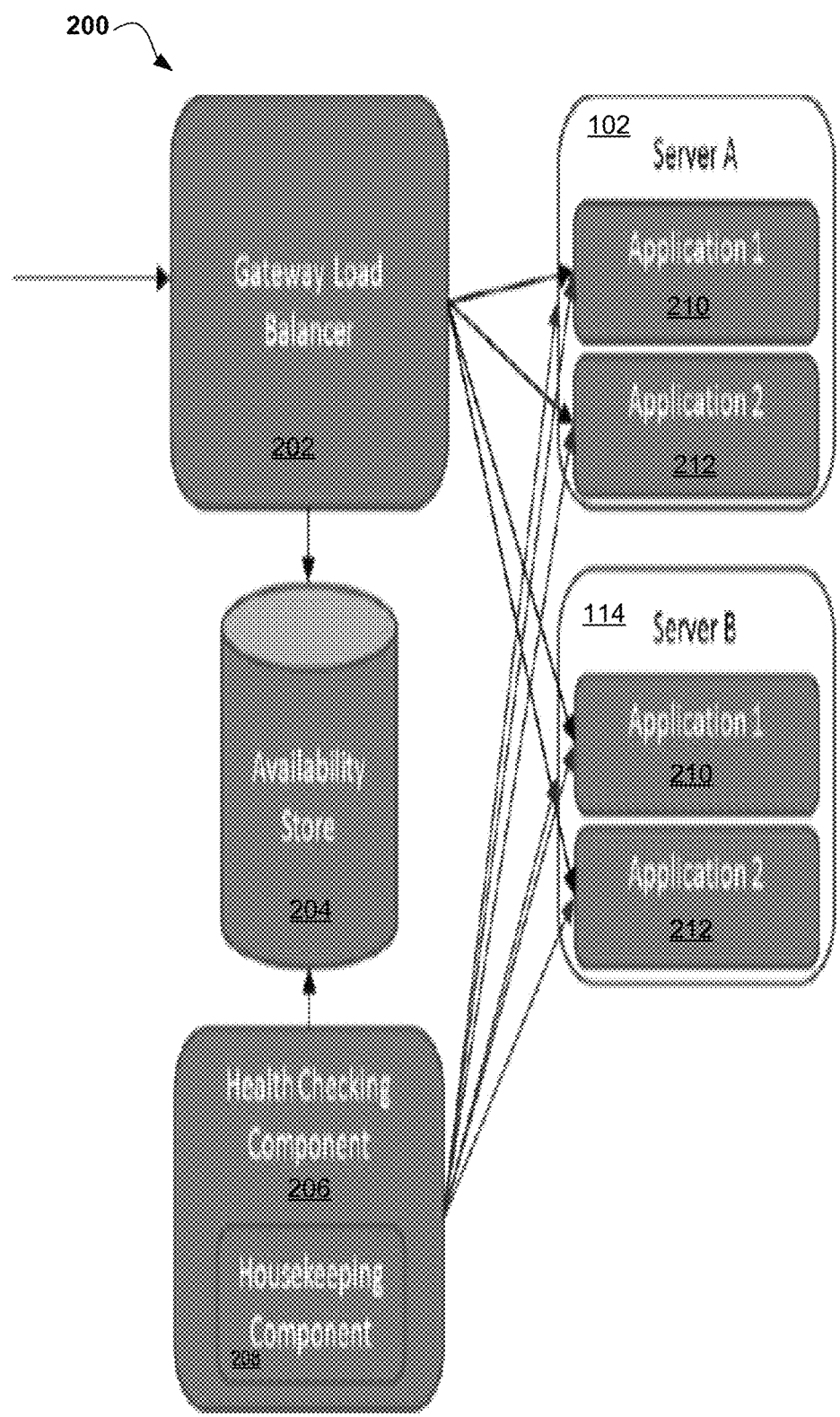
FIG. 2 illustrates an exemplary system architecture according to at least one embodiment.

Referring now to FIG. 2, an exemplary system architecture 200 in accordance with one embodiment is depicted. According to at least one implementation, the Gateway Load Balancer 202 may be configured with the available runtime instances. The server healthcheck (TCP port availability) and application level health check methods; such as HTTP HEAD requests may also be defined. This information will be stored within the Availability Store 204. At this stage the Health Checking Component 206 may start monitoring the availability of the runtime instances. With respect to FIG. 2, this corresponds to ServerA 102 and ServerB 114. According to at least one implementation, when the Gateway Load Balancer 202 receives a request, (i.e., an application request) it will verify if load balancing information is available for this application (e.g., Application 1 210); based on the target URL. However, as this is the first request, it will not be found. Then, the Application 1 210 will be registered within the Availability Store 204 and the Health Checking Component 206 will then start monitoring the availability of the servers and Application 1 210.

The Gateway Load Balancer 202 will then forward the request to the available runtime instance. In the case of the initial request this may be before or after the first Application 1 210 health check depending on the configuration of the system. For example, the Gateway Load Balancer 202 may be configured to wait until the Health Checking Component 206 has verified that the application 210, 212 is available before forwarding or decide to be forwarded based on the server availability information. Additionally, The Gateway Load Balancer 202 also records in the Availability Store 204 the last time a request was sent to an application 210, 212.

Significantly, the Health Checking Component 206 is now monitoring the ServerA 102 and also Application 1 210. As such, if Application 1 210 is disabled on ServerA 102, but the ServerA 102 itself remains available, either deliberately or due to a failure, the Health Checking Component 206 will identify the issue and update the Availability Store 204 with the corresponding information. However, if the entire ServerA 102 is unavailable, then all services on that ServerA 102 will be marked as unavailable. The building up of the applications being load balanced will continue and could be persisted to assure the information is retained.

In an alternate embodiment, an extension may be to remove an application 210, 212 from the healthchecking logic if an application request has not been received over a certain period of time. As such, a Housekeeping Component 208 may be configured to periodically check the Availability Store 204 and remove entries which have not been used for a set time (time period also configurable and may be pre-determined). Therefore, old entries may be stopped from building up in the Availability Store 204 and as a result may improve performance.

Figure 3:
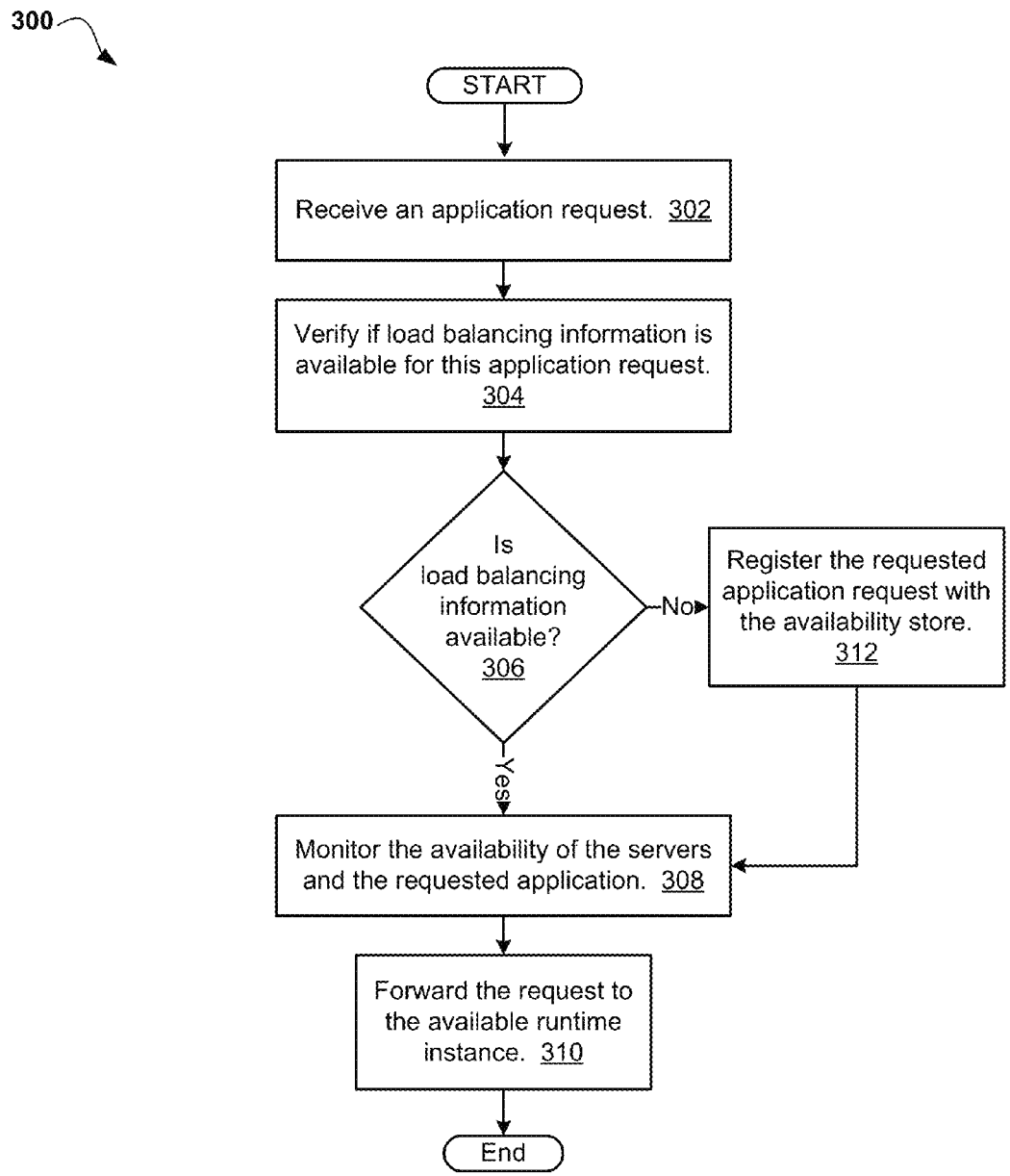
FIG. 3 is an operational flowchart illustrating the steps carried out by a program that that provides a dynamic healthchecking gateway according to at least one embodiment.

Referring now to FIG. 3, an operational flowchart 300 illustrating the steps carried out by a program that provides a dynamic healthchecking gateway in accordance with one embodiment is depicted. As previously described, the Gateway Load Balancer 202 (FIG. 2) may be configured with the available runtime instances and the server healthcheck (TCP port availability) and application level health check method, such as HTTP HEAD requests may also be defined and stored within the Availability Store 204 (FIG. 2).

With respect to FIG. 3 at 302, the Gateway Load Balancer 202 (FIG. 2) receives an application request. Then at 304, the Gateway Load Balancer 202 (FIG. 2) will verify if load balancing information is available for the requested application.

Therefore, at 306, it is determined whether there is load balancing information available for the requested application. According to at least one implementation, the verification, may be based on the target URL. If at 306 it is determined that there is no load balancing information available for the requested application, then the method may continue to step 312 to register the requested application request with the Availability Store 204 (FIG. 2). For example, if this is the first request, the requested application will not be found and therefore, the application will be registered within the Availability Store 204 (FIG. 2). Next at 308, the Health Checking Component 206 (FIG. 2) will begin monitoring the availability of the servers and the requested application.

If at 306 it is determined that there is load balancing information available for the requested application, then the method will proceed directly to step 308 where the Health Checking Component 206 (FIG. 2) will begin monitoring the availability of the servers and the requested application.

Next, at 310, the Gateway Load Balancer 202 (FIG. 2) will forward the request to the available runtime instance. According to at least one implementation and in the case of the initial request this may occur before or after the first application health check depending on the configuration of the system. For example, the Gateway Load Balancer 202 (FIG. 2) may be configured to wait until the Health Checking Component 206 (FIG. 2) has verified that the requested application is available before forwarding or decide to be forwarded based on the server availability information. Additionally, The Gateway Load Balancer 202 (FIG. 2) may also record in the Availability Store 204 (FIG. 2) the last time a request was sent to an application.

Significantly, and as previously described, the Health Checking Component 206 (FIG. 2) begins monitoring the ServerA 102 (FIG. 2) and also the requested application. Therefore, if an application is disabled on a ServerA 102 (FIG. 2), but the ServerA 102 (FIG. 2) itself remains available, either deliberately or due to a failure, the Health Checking Component 206 (FIG. 2) will identify the issue and update the Availability Store 204 (FIG. 2) with the corresponding information. However, if the entire ServerA 102 (FIG. 2) is unavailable, then all services on that ServerA 102 (FIG. 2) will be marked as unavailable. According to the present embodiment, the building up of the applications being load balanced will continue and could be persisted to assure the information is retained.

It may be appreciated that FIGS. 2-3 provide only an illustration of one implementation and does not imply any limitations with regard to how different embodiments may be implemented. Many modifications to the depicted environments may be made based on design and implementation requirements. As previously mentioned, in an alternate embodiment, an extension may be to remove an application from the healthchecking logic if an application request has not been received over a certain period of time. As such, a Housekeeping Component 208 (FIG. 2) may be configured to periodically check the Availability Store 204 (FIG. 2) and remove entries which have not been used for a set time (time period also configurable and may be pre-determined). Therefore, old entries may be stopped from building up in the Availability Store 204 (FIG. 2) and as a result may improve performance.

According to various implementations, the present embodiment does not require individual application health check configuration. Additionally, new applications may be automatically health checked if a request is made for its endpoint. Furthermore, health checks can be automatically disabled based on the history of usage for a particular endpoint. Significantly, the present embodiments provides the capability for a Gateway Load Balancer 202 (FIG. 2) to provide dynamic application based health checking.

Figure 4:
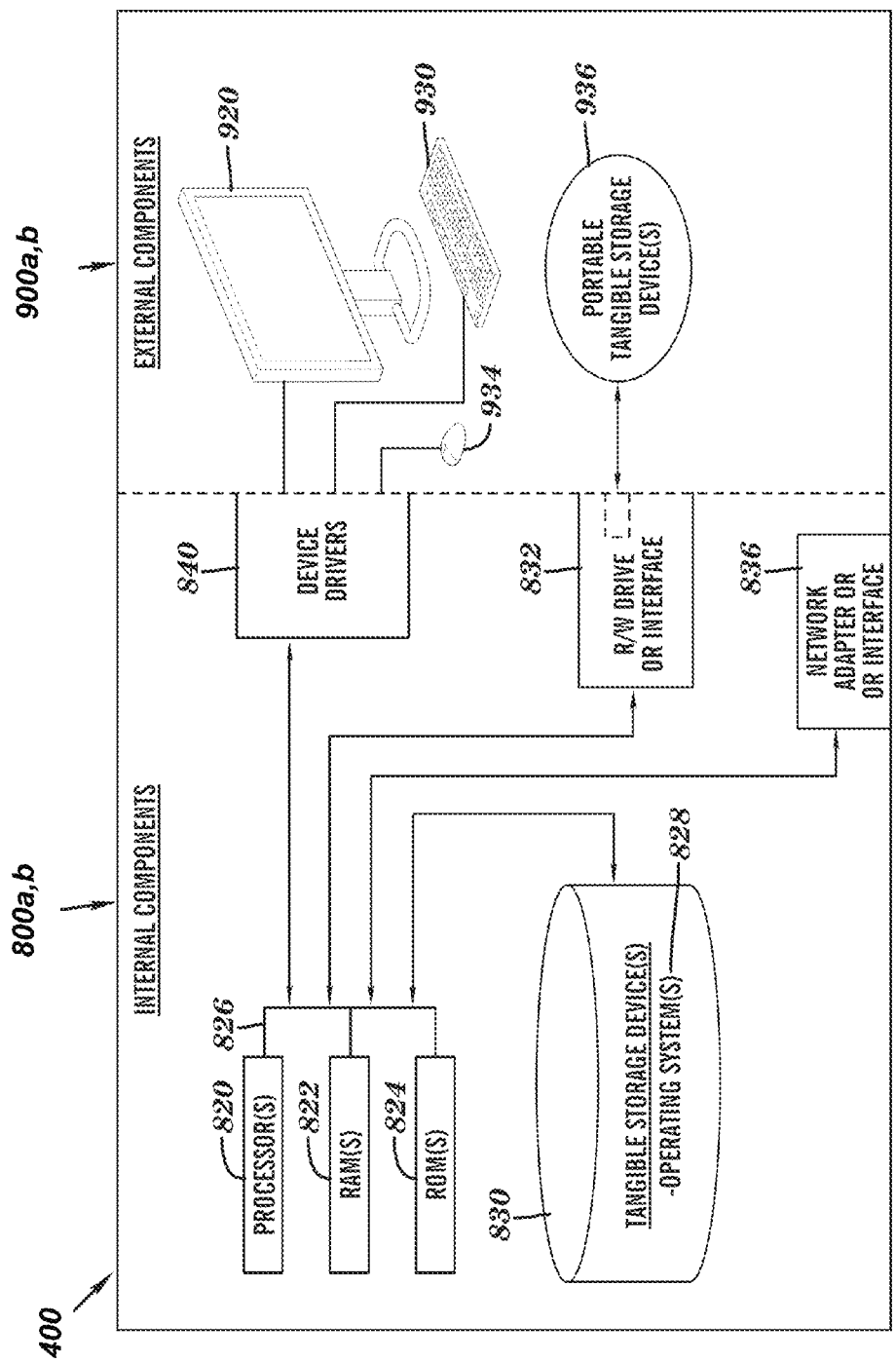
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 *a,b* and external components 900 *a,b* illustrated in FIG. 4. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Healthchecking Load Balancing Gateway Program 116A (FIG. 1) in client computer 102 (FIG. 1) and the Healthchecking Load Balancing Gateway Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a,b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Healthchecking Load Balancing Gateway Program 116A, 116B (FIG. 1) can be stored on one or more of the respective portable computer-readable tangible storage devices 936, read via the respective R/W drive or interface 832 and loaded into the respective hard drive 830.

Each set of internal components 800 *a,b* also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Healthchecking Load Balancing Gateway Program 116A (FIG. 1) in client computer 102 (FIG. 1) and the Healthchecking Load Balancing Gateway Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Healthchecking Load Balancing Gateway Program 116A (FIG. 1) in client computer 102 (FIG. 1) and the Healthchecking Load Balancing Gateway Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
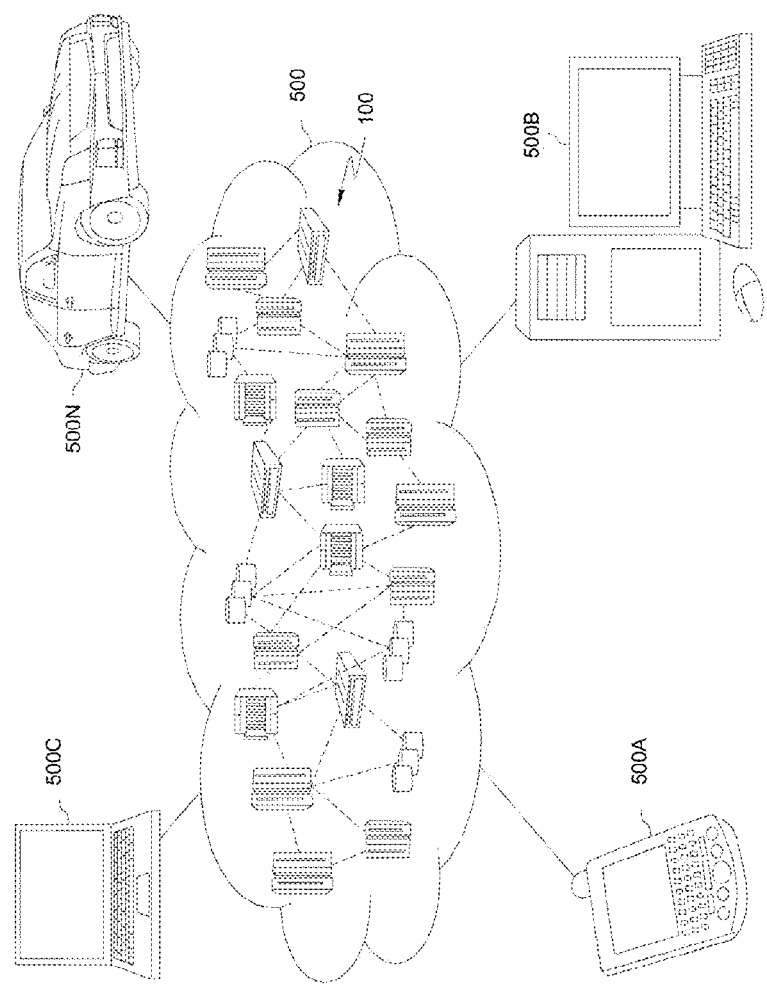
FIG. 5 is a block diagram of an illustrative cloud computing environment including the computer system depicted in FIG. 1, according to at least one embodiment.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
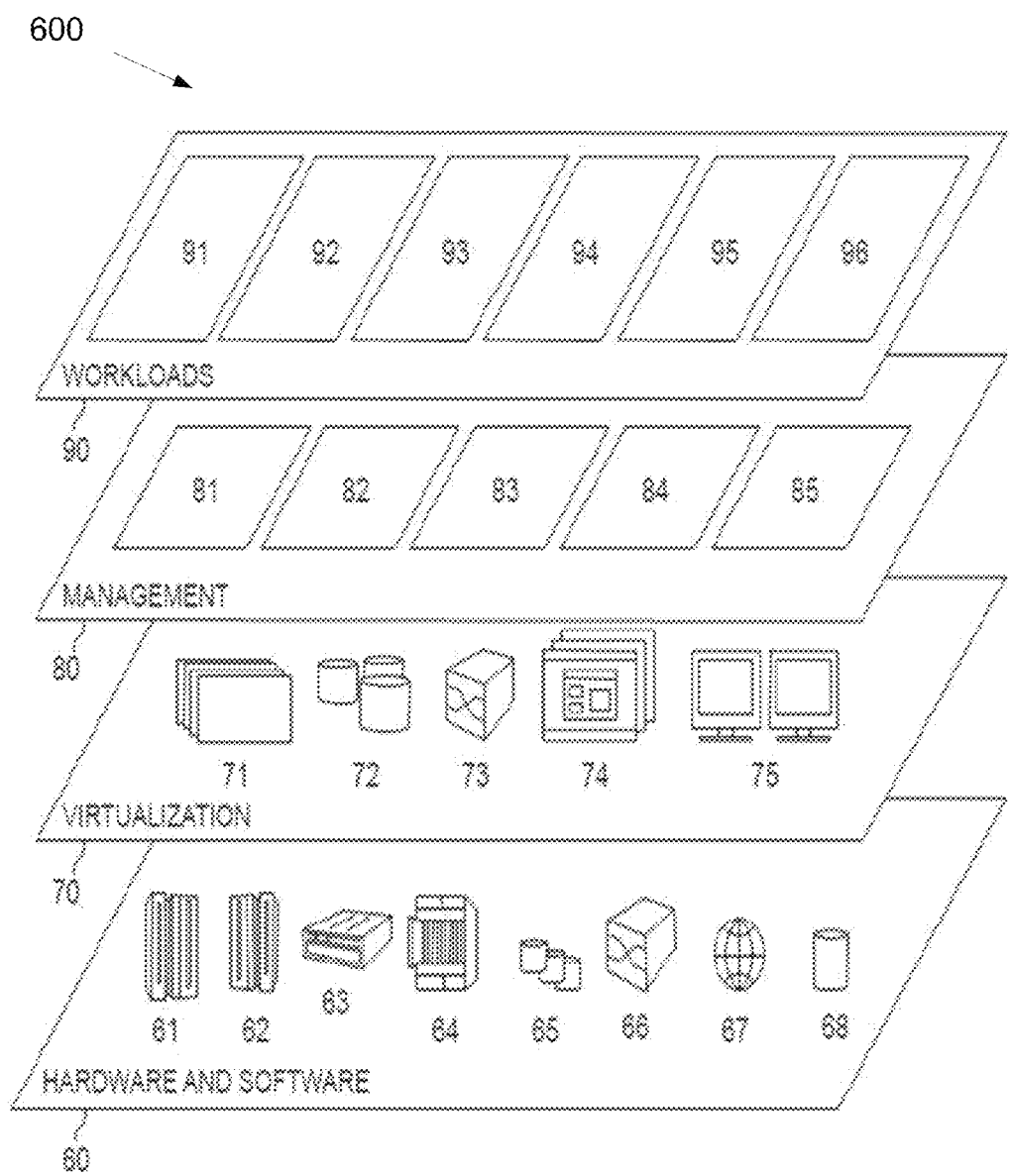
FIG. 6 is a block diagram of functional layers of the illustrative cloud computing environment of FIG. 5, according to at least one embodiment.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Healthchecking Load Balancing Gateway 96. A Healthchecking Load Balancing Gateway Program 116A, 116B (FIG. 1) may provide a dynamic healthchecking load balancing gateway.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for providing a dynamic healthchecking gateway, the method comprising:

receiving, by a processor, an application request;

determining if a plurality of load balancing information is available for the application request;

in response to determining that a plurality of load balancing information is not available for the application request, registering the requested application in a repository;

monitoring the availability of a plurality of servers and the availability of the requested application;

determining an available runtime instance based on the monitoring;

forwarding the received application request to the determined available runtime instance;

determining if at least one application running on a server within the monitored plurality of servers is disabled;

determining if the server associated with the disabled application is available;

in response to determining the server associated with the disabled application is available, identifying at least one issue causing the disabled application to be disabled; and updating a recorded plurality of information associated with the application based on the identified at least one issue.

2. The method of claim 1, wherein the determining if the plurality of load balancing information is available for the application request is based on a target URL.

3. The method of claim 1, further comprising:
recording a last time a request was sent to an application.

4. The method of claim 3, wherein the last time a request was sent to the application is recorded in the repository.

5. The method of claim 1, further comprising:
identifying a plurality of information associated with the availability of each server within the monitored plurality of servers.

6. The method of claim 5, further comprising:
recording the identified plurality of information associated with the availability of each server within the monitored plurality of servers in the repository.

7. The method of claim 1 further comprising:
determining if an entire server within the monitored plurality of servers is unavailable; and
marking all services associated with the determined entire server as unavailable in the repository.

8. The method of claim 1 further comprising:
removing a plurality of entries from the repository based on a request for an application not being received during a pre-determined time period.

9. A computer system for providing a dynamic healthchecking gateway, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving, by a processor, an application request;
determining if a plurality of load balancing information is available for the application request;
in response to determining that a plurality of load balancing information is not available for the application request, registering the requested application in a repository;
monitoring the availability of a plurality of servers and the availability of the requested application;

determining an available runtime instance based on the monitoring;

forwarding the received application request to the determined available runtime instance;

determining if at least one application running on a server within the monitored plurality of servers is disabled;

determining if the server associated with the disabled application is available;

in response to determining the server associated with the disabled application is available, identifying at least one issue causing the disabled application to be disabled; and updating a recorded plurality of information associated with the application based on the identified at least one issue.

10. The computer system of claim 9, wherein the determining if the plurality of load balancing information is available for the application request is based on a target URL.

11. The computer system of claim 9, further comprising:
recording a last time a request was sent to an application.

12. The computer system of claim 11, wherein the last time a request was sent to the application is recorded in the repository.

13. The computer system of claim 9, further comprising:
identifying a plurality of information associated with the availability of each server within the monitored plurality of servers.

14. The computer system of claim 13, further comprising:
recording the identified plurality of information associated with the availability of each server within the monitored plurality of servers in the repository.

15. The computer system of claim 9, further comprising:
determining if an entire server within the monitored plurality of servers is unavailable; and
marking all services associated with the determined entire server as unavailable in the repository.

16. The computer system of claim 9 further comprising:
removing a plurality of entries from the repository based on a request for an application not being received during a pre-determined time period.

17. A computer program product for providing a dynamic healthchecking gateway, the computer program product comprising:
one or more computer-readable storage devices and program instructions stored on at least one of the one or more tangible storage devices, the program instructions executable by a processor, the program instructions comprising:
program instructions to receive, by a processor, an application request;
program instructions to determine if a plurality of load balancing information is available for the application request;
in response to determining that a plurality of load balancing information is not available for the application request, program instructions to register the requested application in a repository;
program instructions to monitor the availability of a plurality of servers and the availability of the requested application;
program instructions to determine an available runtime instance based on the monitoring;
program instructions to forward the received application request to the determined available runtime instance;

program instructions to determine if at least one application running on a server within the monitored plurality of servers is disabled;
program instructions to determine if the server associated with the disabled application is available;
in response to determining the server associated with the disabled application is available, program instructions to identify at least one issue causing the disabled application to be disabled; and
program instructions to update a recorded plurality of information associated with the application based on the identified at least one issue.

18. The computer program product of claim 17, wherein the determining if the plurality of load balancing information is available for the application request is based on a target URL.

19. The computer program product of claim 17, further comprising:
program instructions to record a last time a request was sent to an application.

20. The computer program product of claim 19, wherein the last time a request was sent to the application is recorded in the repository.

\* \* \* \* \*